United States Patent
Robinson

[11] 4,046,853
[45] Sept. 6, 1977

[54] PRODUCTION OF TITANIUM TETRACHLORIDE

[75] Inventor: Michael Robinson, Grimsby, England

[73] Assignee: Laporte Industries Limited, London, England

[21] Appl. No.: 696,280

[22] Filed: June 15, 1976

[30] Foreign Application Priority Data

July 4, 1975 United Kingdom ............ 28175/75

[51] Int. Cl.$^2$ .................. C01G 23/02; C01G 23/04
[52] U.S. Cl. ........................................ 423/77; 423/74; 423/79; 423/492; 423/633
[58] Field of Search ................... 423/74–77, 423/79, 149, 492, 493, 500, 613, 633

[56] References Cited

U.S. PATENT DOCUMENTS

| | | | |
|---|---|---|---|
| 1,933,702 | 11/1933 | Brown | 423/150 |
| 2,653,078 | 9/1953 | Lane | 423/613 |
| 3,261,664 | 7/1966 | Cairns | 423/77 |
| 3,325,252 | 6/1967 | Wikswo et al. | 423/633 |
| 3,865,920 | 2/1975 | Dunn | 423/74 |

OTHER PUBLICATIONS

Antipov et al. "Kinetics of the Reaction between Titanium Tetrachloride and Oxygen" *Zh. Prikl. Khim* (1967) 40 (1), pp. 11–15.

Glorge et al. "Formation of TiO$_2$ Aerosol from the Combustion Supported Reaction of TiCl$_4$ and O$_2$" *Faraday Symposium of the Chem. Soc.* (1973), vol. 7, p. 63.

*Primary Examiner*—O. R. Vertiz
*Assistant Examiner*—Brian E. Hearn
*Attorney, Agent, or Firm*—Kane, Dalsimer, Kane, Sullivan and Kurucz

[57] ABSTRACT

The simultaneous chlorination of the iron and titanium values in an iron containing titaniferous ore such as ilmenite is advantageously conducted to convert the iron values to ferrous chloride but the resulting gaseous effluent is difficult to process to recover the titanium tetrachloride. The iron values in the effluent are partially oxidized according to the equation $$3FeCl_2 + \tfrac{1}{2}O_2 \rightarrow \tfrac{1}{2}Fe_2O_3 + 2FeCl_3$$

thereby reducing the vapor partial pressure of the ferrous chloride while maintaining the presence of some ferrous chloride to scavenge any chlorine emitted from the chlorination stage. The residual gaseous iron chlorides are condensed and chlorine-free titanium tetrachloride may be recovered from the remaining gases. If chlorine-free titanium tetrachloride is not required the mixture of gases resulting from the partial oxidation are reduced in temperature of from 500° C to 800° C and above the dewpoint of the residual ferrous chloride which ferrous chloride may be oxidized directly in the gas phase. This embodiment of the process simplifies the problem of chlorine recovery and is particularly suitable for use in a cyclic process involving chlorine recycle.

15 Claims, 1 Drawing Figure

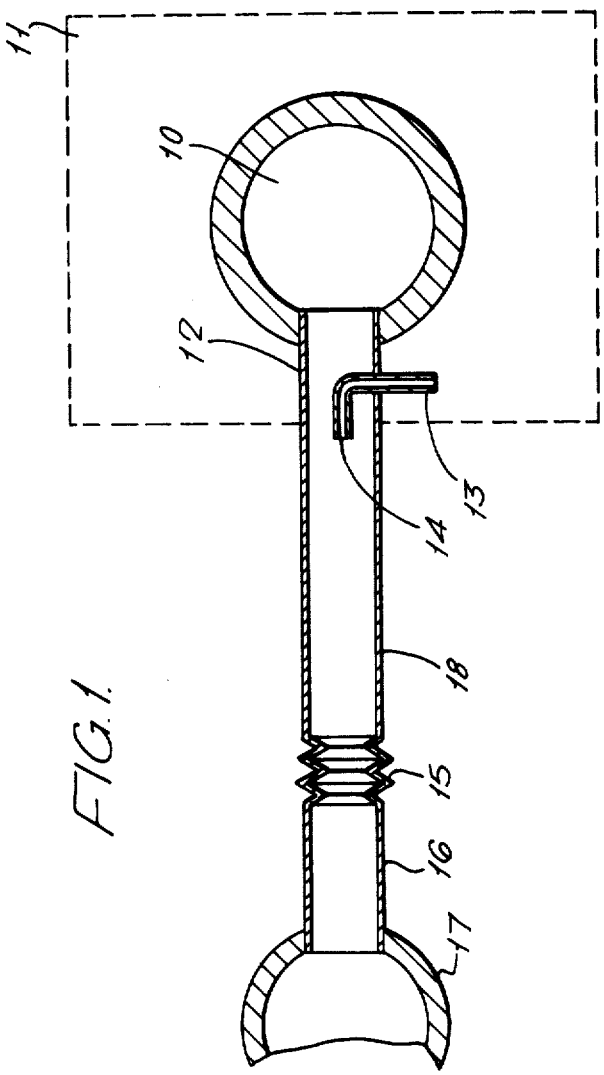

PRODUCTION OF TITANIUM TETRACHLORIDE

BACKGROUND OF THE INVENTION

1. Field of the Invention

This invention relates to the production of titanium tetrachloride utilising as a raw material an iron-containing titaniferous ore or ore concentrate.

2. Brief Description of the Prior Art

Titanium tetrachloride may be produced from such ores by chlorinating the ore or ore concentrate selectively in a fluid bed so that the iron values present in the ore are converted to iron chlorides which are removed from residual titanium values in the ore beneficiate. The residual titanium values may then be chlorinated, in a separate operation, to titanium tetrachloride. This method of producing titanium tetrachloride involves the loss of a certain proportion of the titanium values in the ore by chlorination and removal as vapour with the iron values since in practice the degree of selectivity of chlorination of the iron values will fall somewhat short of theoretical. A further disadvantage of this method is that a high heat load is placed on the fluid bed as a result of removing hot benficiate from the bed. To replace the heat removed a feed preheater is required and this is expensive both in first cost and in fuel. To avoid these disadvantages attempts have been made to produce titanium tetrachloride by chlorinating both the iron and titanium values in the ore, removing the resulting iron and titanium chlorides as a vaporous mixture and then separating the iron chloride from the titanium chloride by condensation of the iron chloride to a solid. The recovery of chlorine from the condensed iron chloride requires volatilization thereof with an accompanying heat requirement which makes the recovered chlorine relatively expensive.

It would be desirable to recover the chlorine from the iron chlorides in the vapor phase, thus eliminating this heat requirement by, for example, oxidizing the iron chlorides in the vapour phase to produce iron oxide and molecular chlorine. Such an oxidation is readily accomplished in the substantial absence of titanium tetrachloride as is disclosed in U.S. Pat. No. 3,865,920. In the presence of substantial quantities of titanium tetrachloride oxidation under the conditions disclosed in that patent would lead to simultaneous oxidation of an appreciable proportion of the titanium tetrachloride and the resulting titanium dioxide would be lost as an impurity of the iron oxide produced.

SUMMARY OF THE INVENTION

The present invention provides a process for the production of titanium tetrachloride comprising simultaneously chlorinating the iron and titanium values in an iron containing titaniferous ore in the form of a fluidized bed of the ore in admixture with particles of carbon, to produce an effluent, the effluent comprising a gaseous mixture of titanium tetrachloride and iron chloride which is predominantly in the form of ferrous chloride, subjecting the effluent to a partial oxidation by mixing it with oxygen in a quantity controlled to oxidise a major proportion only of the ferrous chloride in the effluent to produce a mixture of ferric oxide and ferric chloride according to the equation

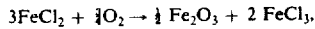

maintaining the temperature of the mixture of the effluent and oxygen, over a period of time sufficient to allow the oxidation of the major proportion of the ferrous chloride to be completed, above that at which the ferrous chloride would condense but below that at which oxidation of the titanium tetrachloride would occur, the mixture of gases resulting from the partial oxidation being in the form of a stream having a velocity sufficient to entrain the resulting particles of ferric oxide at least until the said oxidation has been completed, separating the particles of ferric oxide and recovering titanium tetrachloride from the residual vapor.

We regard iron chloride as being predominantly in the form of ferrous chloride if it is more than 50%, preferably more than 75% and particularly preferably more than 90%, on a molar basis, in that form.

In practice the invention is suitably conducted by passing the mixture of vapour and oxygen through an essentially empty reactor while the oxidation is proceeding.

By an "essentially empty" reactor is meant any reactor, for example a pipe or flue, having no solid packing, baffles, or the like, which would act to prevent the entrainment of the iron oxide.

DETAILED DESCRIPTION OF THE PREFERRED

Embodiments of the Invention

Ilmenite is an iron-containing titaniferous ore particularly suitable for use as a raw material, after the rock or earth constituents in the natural ore have been removed. Ilmenite prepared in this manner may contain up to about 65% by weight of titanium dioxide. Ore or ore concentrates which have already lost some of their iron values by natural or artificial means, for example, ore or ore concentrates which have been partially leached, may also be used as a raw material as may ilmenite sand. The term "ore" is used herein to include each of these alternative raw materials.

The simultaneous chlorination of the iron and titanium values in an iron containing titaniferous ore produces an effluent containing iron and titanium values, in the form of chlorides, in substantially the same proportion in which iron and titanium values were present in the ore as subjected to chlorination. A very low grade ilmenite ore is typified by that found at Bourget, Canada which contains 22.4% $TiO_2$ to 68.1% iron oxides by weight. A high grade ilmenite ore is typified by that found in Florida, U.S.A. which contains 64.1% $TiO_2$ to 30.3% iron oxides by weight (Barksdale Titanium, Ed. 2 pages 44–45). It is evident therefore that when the process of the invention is applied to ilmenite ores the effluent subjected to partial oxidation will contain a quantity of titanium values relative to iron values at least equal to that in the low grade ore quoted above and possibly equal to that in the high grade ore quoted above or even higher if some of the iron values have been removed before chlorination.

When titanium tetrachloride is to be used as a raw material in the production of titanium dioxide it is preferably chlorine-free. If chlorine vapor becomes mixed with titanium tetrachloride vapor some of the chlorine will become dissolved in the liquid titanium tetrachloride condensed from such a mixture. There are processes known to be suitable for the purification of titanium tetrachloride contaminated in this manner for example that described in British Pat. No. 664,615. In that process a vapor containing chlorine is treated at a low temperature with a liquid adsorbent, which may be titanium tetrachloride, so as to adsorb the chlorine selectively which may be recovered from the adsorbent by heating under pressure for example at a temperature of 230° C and 8 atmospheres pressure. It is advantageous if the complication of using a titanium tetrachloride purification stage, such as the above, can be avoided.

There is a tendency for at least some chlorine to slip through the fluidized bed. If only a major proportion of the ferrous chloride is oxidized the remaining ferrous chloride acts as a scavenger for chlorine by reacting with it to form further ferric chloride. This is an important function of the control of oxidation featured in the present invention.

In the course of the partial oxidation the vapor partial pressure of the ferrous chloride remaining unoxidised is lowered and with this the usually marked tendency for the ferrous chloride to form deposits.

It is commonly found that there is a certain amount of carbon blow-over from the bed of ore and carbon and a substantial amount of carbon monoxide may also be issued from the bed. These carbon compounds represent an energy source which has been lost from the bed. These reducing carbon compounds tend to be oxidised in the practice of the invention before the ferrous chloride and the quantity of oxygen used may be controlled accordingly.

Suitably the quantity of oxygen gas mixed with the effluent is sufficient to oxidise any carbon blow-over from the fluidized bed and from 65 to 95% and preferably from 70–90% of the ferrous chloride. When the ferric chloride is solidified the residual ferrous chloride present will also condense but since it will be present in a minor proportion it tends to deposit on the ferric chloride and ferric oxide particles and does not present recovery problems.

The fluidized bed chlorination of the ore is suitably conducted as follows. The ore, in the form of particles an in admixture with particles of a carbonaceous fuel, suitably in a quantity of from 20% to 30% by weight of the ore, is continuously fed into the bed to maintain a sufficient bed depth, which may suitably be from 1.5 to 2.5 meters.

The ore and carbonaceous fuel suitably has a particle size of about 160 microns preferably with no particles outside the range of 75 to 500 microns. So as to present a suitably large surface for reaction without undue losses of fine particles from the bed chlorine is preferably introduced in the fluidizing gas in a quantity not substantially greater than that theoretically required to chlorinate the titanium values in the ore to titanium tetrachloride and the iron values in the ore to ferrous chloride. Sufficient oxygen or an oxygen containing gas is preferably introduced in the fluidizing gas to maintain the temperature of the fluidized bed within the desired range of about 925° to 1075° C preferably 950° to 1025° C.

If the temperature obtained during the oxidation rises to above about 1075° C there may be substantial oxidation of the titanium tetrachloride. The conversion of the ferrous chloride into a mixture of ferric oxide and ferric chloride occurs spontaneously and exothermically and, provided that the quantity of oxygen used in the oxidation is controlled as described above, tends to occur to virtual completion before oxidation of $TiCl_4$, or of ferric chloride, to produce molecular chlorine.

The rates of feed of the chlorine, and the ore are preferably maintained steady to avoid departure from the theoretical proportions. Only a very small quantity of residue will remain in the bed if the ore is an ilmenite concentrate and so the fluidized bed chlorination may be continued for a considerable period before the bed contents become diluted by such residue to an extent sufficient to necessitate a bed shut-down or a bed purge. The velocity of the fluidizing gas is preferably controlled by the addition of inert gas if required to give adequate fluidization. As the chlorination proceeds the iron and titanium values in the ore together with certain other metal values in the ore which are readily chlorinated are carried from the fluidized bed as an effluent possibly together with a certain amount of unreacted chlorine, carbon oxides resulting from the reaction of the carbon in the bed, and inert gases present in the fluidizing gas. In this effluent the ferrous chloride is in the vapor state. We have found that the present process is sufficiently efficient to be operable by contacting an effluent of this type continuously as it is produced with an oxygen containing gas adding, if necessary, any extra amount of heat as may be required to maintain the ferrous chloride in the vapor state throughout the contact time.

Upon oxidation, at the temperatures employed, the ferric oxide will form as a fine solid and will be carried from the oxidation zone in suspension in the vapor stream.

The fluidized bed effluent stream may be contacted with oxygen while it is still within the fluidized bed reactor in the free space above the bed surface. In the operation of a fluidized bed particles from the bed are projected into the free space above the bed surface and there lose momentum, if they are sufficiently large, and fall back into bed. Where the bed is composed of ore and carbon the introduction of oxygen into the effluent gas at too low a level above the bed surface may cause energy losses due to the oxidation of carbon particles which would otherwise have fallen back into the bed. Preferably therefore, the surface of the fluidized bed is in the lower half of a fluidized bed reactor, the reactor encompassing a free space above the fluidized bed surface, said free spaced occupying a major proportion of the total vertical height of the reactor measured from the fluidized bed support plate and the oxygen is introduced at or near the top of the free space. Alternatively the effluent from the fluidized bed may be mixed with oxygen by passing the oxygen into a duct through which the effluent is removed from the fluidized bed reactor. Air may be used as the source of oxygen. Alternatively pure oxygen or a mixture of inert gases with pure oxygen may be used.

To prevent premature condensation of the ferrous chloride the walls of the fluidized bed reaction vessel may be insulated to assist in maintaining the temperature of the effluent gases at a suitably high temperature until the gases have been contacted with oxygen when the exothermicity of the subsequent reactions helps to keep the temperature above the then lowered dew point of the remaining ferrous chloride. Alternatively the fluidized bed reaction vessel may be situated within a furnace.

As a result of the chlorination and oxidation reactions there is produced a stream comprising carbon dioxide, titanium tetrachloride, ferric chloride vapour, essentially a proportion of ferrous chloride vapor, solid ferric oxide particles, inert gases and little or no oxygen, chlorine, carbon or carbon monoxide.

The mixture of gases resulting from the partial oxidation may be cooled to a temperature in the range 130° to 300° C for example to a temperature of from 130° to 150° C, in one or more steps, and the resulting solid mixture of ferric oxide, ferric chloride and ferrous chloride recovered in a cyclone. The gases issuing from the cyclone comprising titanium tetrachloride, carbon dioxide and inert gases may be passed to a conventional condenser system to condense the titanium tetrachloride. The residual vapours are vented to the atmosphere after final stripping of volatiles at, for example −30° C. The titanium tetrachloride produced is chlorine free and is particularly suitable for use as a raw material for the manufacture of titanium dioxide by a vapor phase oxidation process. The solid mixture of oxide and chlorides is treated to recover the chlorine content thereof. For this purpose an oxidation process as disclosed in British Pat. No. 1,330,173 may be utilized. The use of the air to conduct the partial oxidation of the $FeCl_2$ makes it possible to conduct this stage of the process considerably more economically since oxidation of carbon from the fluidized bed reduces the oxygen demand.

Alternatively the mixture of gases resulting from the partial oxidation may be cooled to a temperature in the range of 500°–800° C and above the dew point of any ferrous chloride remaining in the mixture and at this temperature subjected to a secondary oxidation by mixing with oxygen preferably in excess over that required to to oxidize the iron chloride vapor present in the gas stream to ferric oxide and so release chloride gas into the said mixture of gases.

Ferrous chloride has been regarded as a most undesirable constituent of an ore chlorination effluent. By conducting a combination of a partial and secondary oxidation according to this invention deposition of ferrous chloride can be greatly reduced or substantially eliminated without any substantial loss of the titanium tetrachloride present in the effluent or of the chlorine utilized and despite the large proportion of ferrous chloride present. This removes problems hitherto associated with chlorination to convert the iron values in the ore to ferrous chloride. The oxidation of the ferric chloride may be accomplished without the titanium tetrachloride present being oxidized. Up to 20% excess of oxygen over that required in theory to oxidize the ferric chloride and the remaining ferrous chloride should be used to conduct this secondary oxidation. The secondary oxidation may be conducted before or after the iron oxide particles formed in the controlled partial oxidation have been removed. For example, the iron oxide particles may be removed and the cooling achieved in a single step by using a cooled cyclone to remove the iron oxide particles. The secondary oxidation may be performed in the tube reactor with sand used periodically to remove any deposits which may form in it. After the secondary oxidation the ferric oxide particles may be removed in a cyclone, the gases having been cooled to below 300° C to condense any residual iron chlorides onto the iron oxide. The gases are further cooled to condense titanium tetrachloride which may be treated to remove dissolved chlorine gas by for example heating under pressure as dissolved in British Pat. No. 664,615. The remaining gas stream may be treated to remove chlorine gas by, for example the process described in the same British patent and the residual vapours may be vented to the atmosphere after final stripping of volatiles at a temperature of, for example, −30° C.

BRIEF DESCRIPTION OF THE DRAWING

This invention is illustrated by means of the following example. The apparatus utilized is illustrated in the accompanying drawing which depicts a cross-sectional view of a pipe reactor in which the oxidation may be conducted showing its connection with an ore chlorinator.

The apparatus comprises a vertical cylindrical fluidized bed reactor made of silica 10 having a diameter of 12.5 cm. a height of 1.8 m and having a hemispherical closure at each end. A gas inlet pipe, having a diameter of 25 mm, for the fluidizing/chlorinating gas, is provided in the lower hemispherical closure. A solids inlet pipe having a diameter of 40 mm is provided in the upper closure together with a suitable air lock and valves to enable solids to be fed to the chlorinator continuously as required. The reactor 10 is surrounded for the whole of its height by a gas-fired furnace 11. A tube 12 having a diameter of 60 mm and a length of 2.2 m extends horizontally from the upper part of the reactor 10. An inlet pipe 13 having a diameter of 7 mm for oxygen containing gas extends into the interior of pipe 12 at a point within the furnace 11 and has an open end 14 within pipe 12 which is concentric with pipe 12.

Flexible bellows 15 provide a point of attachment for the tube 12 to the inlet pipe of a mild steel cyclone 17. A further tube made of silica leads from the cyclone to a condenser and receiver and then via a caustic soda scrubber and to an exit stack.

EXAMPLE 25 kg of ilmenite and 7 kg of petroleum coke were added to the preheated reactor 10 and fluidized with nitrogen until the bed reached 925° C. The ilmenite used was W. Australian ilmenite(54.5% $TiO_2$, 31% Fe present as oxides, mean particle size 165 μ). A flow of 1 kg/hr $Cl_2$ was then introduced with the fluidizing nitrogen so as to form a fluidizing gas not exceeding 30% v/v $Cl_2$ and the reaction continued until chlorine slip was detected in the off-gases. Up to this point only the iron values in the ore were being chlorinated. At this time the fluidizing gas was altered to comprise 4.60 kg/hr $Cl_2$, 0.37 kg/hr $N_2$, 0.4 kg/hr $O_2$, and a steady feed of 3.32 kg/hr ilmenite and 0.73 kg/hr coke was commenced. The bed temperature was established at 950° C by adjustment to the furnace. After a further hour steady state operation existed in the fluid bed, and typically the dew point of $FeCl_2$ in the gases leaving the bed was 910° C as calculated from the vapor pressure data of $FeCl_2$. The effluent from the bed has the composition indicated in the following table.

2.124 kg/hr of air was then added via the oxidation inlet tube 13 so as to discharge the oxidant gases evenly into the chloride gases and effect rapid mixing. The arrangement of a concentric air tube discharging oxygen at a velocity several times higher than the velocity of gases to be oxidized is a simple but effective way of carrying out the mixing in a unit of the present size. It was calculated that the dew point of the $FeCl_2$ before the oxidation started was 840° C and the reactant gases were held at a temperature not less than 40° C greater than this. After the admission of air, oxidation proceeded the dew point falling to 815° C. The composition of the stream after oxidation was as given in the table following.

The cyclone was cooled to give a product temperature of 250° C. It condensed the FeCl$_3$ and FeCl$_2$ on to the Fe$_2$O$_3$. The resulting mixture of solids may be treated by known means to recover the chlorine content thereof, for recycle to chlorinator. The residual gases were cooled to condense the TiCl$_4$ which was found to be free of dissolved chlorine.

In modification of this example the cooling of the cyclone was adjusted to give a product temperature of 600° C and the cyclone exit tube was insulated with mineral wool to maintain that product temperature. A flow of 0.26 kg/hr of oxygen, preheated to 500° C was introduced into insulated tube. The resulting ferric oxide particles were removed. The residual gases had the composition indicated in the Table.

Table

| | Composition of stream Kg/hr. | | |
|---|---|---|---|
| | after chlorination | after controlled partial oxidation | after sec. oxidation |
| TiCl$_4$ | 4.16 | 4.0 | 3.99 |
| FeCl$_2$ | 2.22 | 0.34 | — |
| FeCl$_3$ | — | 1.16 | — |
| C | 0.1 | — | — |
| CO | 0.19 | — | — |
| CO$_2$ | 1.9 | 2.6 | 2.6 |
| N$_2$ | 0.37 | 2.16 | 2.15 |
| Fe$_2$O$_3$ | — | 0.29 | — |
| O$_2$ | — | — | — |
| Cl$_2$ | 0 - 0.02 | — | 1.255 |

What we claim is:

1. A process for the production of titanium tetrachloride from an iron-containing titaniferous ore, which comprises;
   chlorinating said ore in a fluidized bed of a mixture of the ground ore and a carbonaceous material to obtain an effluent gas which comprises a mixture of titanium tetrachloride and iron chlorides in the vapor state, more than 50 percent of said iron chlorides being ferrous chloride;
   oxidizing from 65 to 95 percent of the ferrous chloride in said effluent gas by mixing with the effluent gas a proportion of oxygen sufficient to oxidize any carbon blow-over from the fluidized bed and from 65 to 95 percent of the ferrous chloride in said effluent gas while maintaining the temperature of the effluent gas-oxygen mixture above the dew point of the ferrous chloride but below about 1075° C., whereby the oxidized effluent gas contains ferric oxide and ferric chloride as the predominant iron chloride component;
   moving the mixture of gases resulting from oxidizing, in a stream having a velocity sufficient to entrain particles of the ferric oxide formed, to a particle separation zone;
   separating ferric oxide and any residual ferrous chloride and ferric chloride from the moved mixture of gases to obtain a residual gas containing titanium tetrachloride vapor; and
   condensing said titanium tetrachloride vapor from said residual gas.

2. A process as claimed in claim 1 wherein the iron-containing titaniferous ore is an ilmenite ore.

3. A process as claimed in claim 2 wherein the proportion of titanium relative to iron in the effluent is at least equal to that found in Bourget ilmenite.

4. A process as claimed in claim 2 wherein at least 75% of the iron chloride in the effluent, on a molar basis, is in the form of ferrous chloride.

5. A process as claimed in claim 4 wherein the fluidized bed is operated continuously, by introducing the ore and from 20 to 30% by weight thereof of carbon into the bed to maintain a bed depth of from 1.5 to 2.5 meters, and fluidizing the bed by means of a gas comprising chlorine in a quantity not in excess of that required theoretically to chlorinate the titanium in the ore to titanium tetrachloride and the iron to ferrous chloride, and sufficient oxygen to maintain a bed temperature of from 925° to 1075° C.

6. A process as claimed in claim 1 wherein the bed temperature is maintained at from 950° to 1025° C.

7. A process as claimed in claim 5 wherein the effluent is maintained at a temperature of at least 40° C above the dew point of the ferrous chloride present therein.

8. A process as claimed in claim 5 wherein the fluidized bed is contained in the lower half of a fluidized bed reactor, the reactor encompassing a free space above the surface of the fluidized bed and the free space occupying the major proportion of the total vertical height of the fluidized bed reactor measured from the bed support plate.

9. A process as claimed in claim 8 wherein the effluent issuing from the fluidized bed is mixed with oxygen by passing the oxygen into the free space at or near the top thereof.

10. A process as claimed in claim 8 wherein the effluent issuing from the fluidized bed is mixed with oxygen by passing the oxygen into a duct through which the effluent is removed from the reactor containing the fluidized bed.

11. A process as claimed in claim 8 wherein the mixture of gases resulting from the oxidizing is cooled to a temperature in the range 130° to 300° C before separation of the entrained particles of ferric oxide to condense any residual ferrous chloride and ferric chloride onto said particles.

12. A process as claimed in claim 11 wherein the solid mixture of ferric oxide, ferric chloride and ferrous chloride resulting from the condensation is oxidised to release the chlorine content thereof, which chlorine is recycled to chlorinate a further quantity of iron-containing titaniferous ore.

13. A process as claimed in claim 8 wherein the mixture of gases resulting from the oxidizing is cooled to a temperature in the range 500° to 800° C and above the dew point of any ferrous chloride remaining in the mixture and at this temperature is subjected to a secondary oxidation by mixing it with oxygen in a quantity in excess over that required to oxidize the iron chlorides in the said mixture to ferric oxide.

14. A process as claimed in claim 13 wherein the titanium tetrachloride recovered from the mixture of gases resulting from the secondary oxidation is treated to recover chlorine therefrom.

15. A process as claimed in claim 14 wherein the chlorine is recycled to chlorinate a further quantity of iron containing titaniferous ore.

* * * * *